US010493553B2

(12) United States Patent
Ide

(10) Patent No.: US 10,493,553 B2
(45) Date of Patent: Dec. 3, 2019

(54) ARC WELDING CONTROL METHOD

(71) Applicant: DAIHEN CORPORATION, Osaka (JP)

(72) Inventor: Akihiro Ide, Osaka (JP)

(73) Assignee: DAIHEN CORPORATION, Osaka (JP)

( * ) Notice: Subject to any disclaimer, the term of this patent is extended or adjusted under 35 U.S.C. 154(b) by 543 days.

(21) Appl. No.: 15/102,914

(22) PCT Filed: Jan. 8, 2015

(86) PCT No.: PCT/JP2015/050383
§ 371 (c)(1),
(2) Date: Jun. 9, 2016

(87) PCT Pub. No.: WO2015/105151
PCT Pub. Date: Jul. 16, 2015

(65) Prior Publication Data
US 2016/0303679 A1  Oct. 20, 2016

(30) Foreign Application Priority Data
Jan. 10, 2014  (JP) .................................. 2014-003217

(51) Int. Cl.
*B23K 9/095* (2006.01)
*B23K 9/12* (2006.01)
(Continued)

(52) U.S. Cl.
CPC .............. *B23K 9/125* (2013.01); *B23K 9/073* (2013.01); *B23K 9/09* (2013.01); *B23K 9/0953* (2013.01)

(58) Field of Classification Search
CPC ..... B23K 9/125; B23K 9/1006; B23K 9/0953
(Continued)

(56) References Cited

U.S. PATENT DOCUMENTS 5,973,291 A * 10/1999 Kramer .................. B23K 9/125
219/130.01
6,903,305 B2 * 6/2005 Mukai .................. B23K 9/1336
219/137.7
(Continued)

FOREIGN PATENT DOCUMENTS

CN   102149501   8/2011
JP   11-226732   8/1999
(Continued)

OTHER PUBLICATIONS

Written Opinion of the International Searching Authority in International Patent Application No. PCT/JP2015/050383, dated Jul. 12, 2016, and an English translation thereof.
(Continued)

*Primary Examiner* — Tu B Hoang
*Assistant Examiner* — Thomas J Ward
(74) *Attorney, Agent, or Firm* — Greenblum & Bernstein, P.L.C.

(57) ABSTRACT

There is provided an arc welding control method of feeding a welding wire according to a push-pull feeding control using a push-side feeding motor which rotates in a forward feeding direction at a feeding rate set to a push feeding-rate setting value and a pull-side feeding motor which alternates a forward feeding rotation and a reverse feeding rotation periodically, and generating short-circuiting periods and arc periods to perform welding. An average feeding rate of the pull-side feeding motor is detected. The push feeding-rate setting value is corrected to the detected average feeding rate of the pull-side feeding motor.

7 Claims, 3 Drawing Sheets

(51) Int. Cl.
B23K 9/073 (2006.01)
B23K 9/09 (2006.01)

(58) Field of Classification Search
USPC .................... 219/130.33, 137.71, 137 R
See application file for complete search history.

(56) References Cited

U.S. PATENT DOCUMENTS

| | | | |
|---|---|---|---|
| 8,993,925 B2 | 3/2015 | Fujiwara et al. | |
| 2006/0016792 A1* | 1/2006 | Uecker | B23K 9/0735 219/137.71 |
| 2011/0309063 A1 | 12/2011 | Ott et al. | |
| 2012/0074114 A1 | 3/2012 | Kawamoto et al. | |
| 2012/0111842 A1* | 5/2012 | Fujiwara | B23K 9/125 219/130.33 |
| 2013/0068744 A1* | 3/2013 | Matsui | B23K 9/092 219/137 R |
| 2013/0082040 A1 | 4/2013 | Kawamoto et al. | |
| 2013/0082041 A1 | 4/2013 | Kawamoto et al. | |

FOREIGN PATENT DOCUMENTS

| | | |
|---|---|---|
| JP | 2000-158136 | 6/2000 |
| JP | 2007-275995 | 10/2007 |
| JP | 2009-279636 | 12/2009 |
| JP | 5201266 | 6/2013 |
| WO | 2012/164833 | 12/2012 |

OTHER PUBLICATIONS

U.S. Appl. No. 15/105,714 to Akihiro Ide, filed Jun. 17, 2016.
International Search Report for International Patent Application No. PCT/JP2015/050383, dated Apr. 14, 2015, and a partial English translation.
Chinese Office Action issued for Chinese Patent Application No. 201580002523.2 dated Feb. 23, 2018 along with English translation thereof.

* cited by examiner

ARC WELDING CONTROL METHOD

TECHNICAL FIELD

The present invention relates to an arc welding control method of performing welding in a manner of feeding a welding wire according to a push-pull feeding control using a push-side feeding motor which rotates in a forward feeding direction at a feeding rate set to a push feeding-rate setting value and a pull-side feeding motor which alternates a forward feeding rotation and a reverse feeding rotation periodically, and generating short-circuiting periods and arc periods.

BACKGROUND ART

In a typical consumable electrode arc welding, welding is performed by feeding a welding wire as a consumable electrode at a constant feeding rate and generating an arc between the welding wire and base material. In the consumable electrode arc welding, both the welding wire and the base material are mostly placed in a welding state in which a short-circuiting period and an arc period are alternately repeated.

In order to further improve welding quality, there has been proposed a welding method of alternating feeding of the welding wire between a forward feeding and a reverse feeding periodically (see Patent Document 1, for example).

In this welding method, the feeding of the welding wire is required to be changed between the forward feeding state and the reverse feeding state at a high speed, e.g., every about 5 ms. To this end, a feeding motor is installed near a tip of a welding torch so as to shorten a feeding path from the feeding motor to the tip of the welding torch. However, as only the feeding motor of a small size is permitted to be installed near the tip of the welding torch due to a limited installation space, a feeding torque becomes insufficient sometimes. To solve this problem, a push-pull feeding control system is configured to use two feeding motors in a manner that one (push side) of the feeding motors is installed at an upstream side of the feeding path and the other feeding motor (pull side) is installed neat the tip of the welding torch on the downstream side of the feeding path. In this push-pull feeding control system, the push-side feeding motor is controlled to perform a constant feeding-rate operation in the forward feeding state, whilst the pull-side feeding motor is controlled to alternate the forward feeding and the reverse feeding periodically. Hereinafter this welding method will be explained.

FIG. 3 is a waveform diagram of the welding method in which the push-pull feeding control system is employed to periodically repeat the forward feeding and the reverse feeding as to the feeding rate. (A) of this figure shows individual waveforms of a pull feeding-rate setting signal Fr (solid line) and a pull feeding rate Fw (broken line), (B) of this figure shows a waveform of a welding current Iw, (C) of this figure shows a waveform of a welding voltage Vw, and (D) of this figure shows a waveform of a push feeding rate Pw. Hereinafter explanation will be made with reference to this figure.

As shown in (A) of this figure, in each of the pull feeding-rate setting signal Fr and the pull feeding rate Fw, an upper side than 0 represents a forward feeding period and a lower side represents a reverse feeding period. The forward feeding represents feeding of the welding wire in a direction approaching the base material, whilst the reverse feeding represents feeding of the welding wire in a direction separating from the base material. The pull feeding-rate setting signal Fr has a waveform which changes sinusoidally and shifts on the forward feeding side. The tip of the welding wire is fed forwardly and reversely at the pull feeding rate Fw. As an average value of the pull feeding-rate setting signal Fr is positive, the welding wire is fed forwardly in average. As shown in (D) of this figure, the push feeding rate Pw is controlled to perform a constant feeding-rate operation in the forward feeding state based on a push feeding-rate setting signal (not shown) set in advance. The average value of the pull feeding-rate setting signal Fr and the push feeding-rate setting signal are set to be equal to each other.

As shown by the solid line in (A) of this figure, the pull feeding-rate setting signal Fr is 0 at a time point t1. A period from the time point t1 to a time point t2 corresponds to a forward feeding acceleration period. The pull feeding-rate setting signal Fr is the maximum value of the forward feeding at the time point t2. A period from the time point t2 to a time point t3 corresponds to a forward feeding deceleration period. The pull feeding-rate setting signal Fr is 0 at the time point t3. A period from the time point t3 to a time point t4 corresponds to a reverse feeding acceleration period. The pull feeding-rate setting signal Fr is the maximum value of the reverse feeding at the time point t4. A period from the time point t4 to a time point t5 corresponds to a reverse feeding deceleration period. Then a period from the time point t5 to a time point t6 is the forward feeding acceleration period again, and a period from the time point t6 to a time point t7 is the forward feeding deceleration period again. For example, the maximum value of the forward feeding is 50 m/min, the maximum value of the reverse feeding is −40 m/min, the forward feeding period is 5.4 ms, and the reverse feeding period is 4.6 ms. In this case, the single period is 10 ms, and the short-circuiting period and the arc period are alternately repeated with 100 Hz. An average value of the pull feeding rate Fw in this case is about 4 m/min (an average value of the welding current is about 150 A).

As shown by the broken line in (A) of this figure, the pull feeding rate Fw is an actual feeding rate. The pull feeding rate represents a sinusoidal wave which rises and falls later than the pull feeding-rate setting signal Fr. The pull feeding rate Fw is 0 at a time point t11. A period from the time point t1 to a time point t21 corresponds to a forward feeding acceleration period. The pull feeding rate Fw is the maximum value of the forward feeding at the time point t21. A period from the time point t21 to a time point t31 corresponds to a forward feeding deceleration period. The pull feeding rate Fw is 0 at the time point t31. A period from the time point t31 to a time point t41 corresponds to a reverse feeding acceleration period. The pull feeding rate Fw is the maximum value of the reverse feeding at the time point t41. A period from the time point t41 to a time point t51 corresponds to a reverse feeding deceleration period. Then a period from the time point t51 to a time point t61 is the forward feeding acceleration period again, and a period from the time point t61 to a time point t71 is the forward feeding deceleration period again. This is due to transient characteristics of the pull feeding motor and a feeding resistance of the feeding path.

A welding power supply controlled to a constant voltage is used for the consumable electrode arc welding. Short circuit between the welding wire and the base material occurs mostly before or after the maximum value of the pull feeding rate Fw in the forward feeding at the time point t21. This figure shows a case where the short circuit occurs at a time point t22 during the forward feeding deceleration period after the maximum value in the forward feeding. If the short circuit occurs at the time point t22, the welding voltage Vw rapidly reduces to a short circuit voltage value of a few volts as shown in (C) of this figure, whilst the welding current Iw increases gradually as shown in (B) of this figure.

As shown in (A) of this figure, from the time point t31, as the pull feeding rate Fw is placed in the reverse feeding period, the welding wire is reversely fed. The short circuit is released by this reverse feeding, and hence an arc is generated again at a time point t32. The arc is regenerated mostly before or after the maximum value of the pull feeding rate Fw in the reverse feeding at the time point t41. This figure shows a case where the arc is generated at the time point t32 during the reverse feeding acceleration period before the maximum value of the reverse feeding. Thus a time period from the time point t22 to the time point t32 becomes the short-circuiting period.

If the arc is regenerated at the time point t32, the welding voltage Vw increases rapidly to an arc voltage value of several tens of volts as shown in (C) of this figure. As shown in (B) of this figure, the welding current Iw starts changing from the maximum value state during the short-circuiting period.

As shown in (A) of this figure, during a period from the time point t32 to the time point t51, as the pull feeding rate Fw is in the reverse feeding state, the welding wire is raised and hence a length of the arc becomes longer gradually. If the arc length becomes longer, the welding voltage Vw increases, and hence the welding current Iw reduces due to the constant voltage control. Thus during the reverse feeding period in the arc period from the time point t32 to the time point t51, the welding voltage Vw increases gradually as shown in (C) of this figure, whilst the welding current Iw reduces gradually as shown in (B) of this figure.

Then the next short circuit occurs at a time point t62 within the forward feeding deceleration period of the pull feeding rate Fw from the time point t61 to the time point t71. A time period from the time point t32 to the time point t62 corresponds to the arc period. As shown in (A) of this figure, during a period from the time point t51 to the time point t62, as the pull feeding rate Fw is in the forward feeding state, the welding wire is forwardly fed and hence a length of the arc becomes shorter gradually. If the arc length becomes shorter, the welding voltage Vw reduces, and hence the welding current Iw increases due to the constant voltage control. Thus during the forward feeding period in the arc period from the time point t51 to the time point t62, the welding voltage Vw reduces gradually as shown in (C) of this figure, whilst the welding current Iw increases gradually as shown in (B) of this figure.

As described above, in the welding method of repeating the forward feeding and the reverse feeding of the welding wire alternately, the repetition period of the short circuit and the arc can be set to a desired value despite that such the setting is impossible in the related art of the feeding at a constant feeding rate. Thus a generation ratio of spatter can be reduced and improvement of welding quality such as improvement of bead appearance can be achieved.

PRIOR ART DOCUMENT

Patent Document

Patent Document 1: Japanese Patent No. 5201266

SUMMARY OF INVENTION

Problems to be Solved by Invention

As described above, in the related art, the push-side feeding motor is controlled to perform the constant feeding-rate operation based on the push feeding-rate setting signal, whilst the pull-side feeding motor is controlled to alternate the forward feeding and the reverse feeding periodically based on the pull feeding-rate setting signal Fr. The tip of the welding wire is alternately fed forwardly and reversely at the pull feeding rate Fw. As described above, there arises a phase difference between the waveform of the pull feeding-rate setting signal Fr and the waveform of the pull feeding rate Fw each changing periodically, due to influence of the transient characteristics of the pull-side feeding motor and the feeding resistance of the feeding path (hereinafter collectively referred to as change of the feeding resistance). The transient characteristics differs depending on the kind of the pull-side feeding motor to be used. Further the feeding resistance of the feeding path differs depending on the kind of the welding torch to be used. Furthermore when the welding is performed repeatedly, the feeding path is worn away gradually and hence the feeding resistance changes. The phase difference arises between the waveform of the pull feeding-rate setting signal Fr and the waveform of the pull feeding rate Fw according to these changes of the feeding resistance. In other words, even if the pull feeding-rate setting signal Fr is kept to be same and does not change, the pull feeding rate Fw changes according to the change of the feeding resistance. In such the situation, there arises a difference between the push feeding rate Pw as the constant feeding rate and the average value of the pull feeding rate Fw Consequently the feeding state of the welding wire becomes unstable and hence the welding state degrades.

Accordingly an object of the present invention is to provide an arc welding control method which, in a welding operation of alternating feeding of a welding wire between forward feeding and reverse feeding periodically according to a push-pull feeding control, can stably maintain a feeding state of the welding wire even if a feeding resistance changes.

Means for Solving Problems

According to the present invention, there is provided an arc welding control method of feeding a welding wire according to a push-pull feeding control using a push-side feeding motor which rotates in a forward feeding direction at a feeding rate set to a push feeding-rate setting value and a pull-side feeding motor which alternates a forward feeding rotation and a reverse feeding rotation periodically, and generating short-circuiting periods and arc periods to perform welding, comprising: detecting an average feeding rate of the pull-side feeding motor; and correcting the push feeding-rate setting value to the detected average feeding rate of the pull-side feeding motor.

According to the present invention, the arc welding control method further comprising storing the corrected push feeding-rate setting value upon completion of the welding.

Advantageous Effects of Invention

According to the present invention, even if a feeding resistance changes and hence the average feeding rate of the pull-side feeding motor changes, as the push feeding-rate setting value is corrected to follow the average feeding rate, the feeding rate of the push-side feeding motor is controlled so as to equal the average feeding rate of the pull-side feeding motor. Consequently as the feeding rate of the push-side feeding motor always equals the average feeding rate of the pull-side feeding motor, a feeding state of the welding wire becomes stable. Accordingly in the present invention, in the welding of alternating the feeding of the welding wire between the forward feeding and the reverse feeding periodically according to the push-pull feeding control, even if the feeding resistance changes, the feeding state of the welding wire can be maintained stably.

EMBODIMENTS OF INVENTION

Hereinafter an embodiment according to the present invention will be explained with reference to drawings.

First Embodiment

Figure 1:
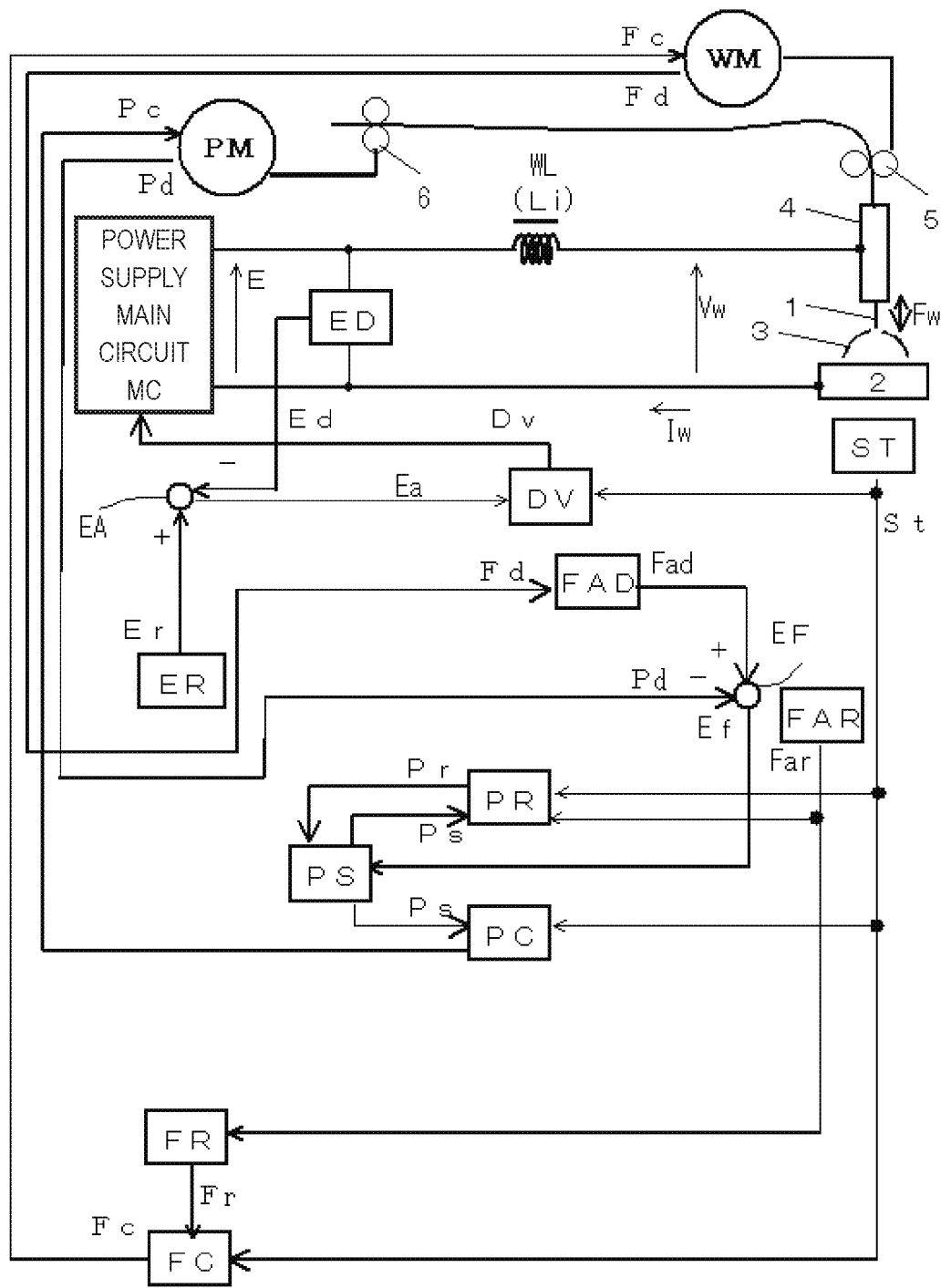
FIG. 1 A block diagram illustrating a welding power supply for implementing an arc welding control method according to a first embodiment of the present invention.

FIG. 1 is a block diagram illustrating a welding power supply for implementing an arc welding control method according to a first embodiment of the present invention. Hereinafter individual blocks in this embodiment will be explained with reference to this figure.

A power supply main circuit MC inputs a power of three-phase 200V or the like from a commercial power supply (not shown), then subjects the input power to an output control such as an inverter control according to a drive signal Dv described later, and outputs an output voltage E. Although not shown in the figure, this power supply main circuit MC includes a primary rectifier for rectifying the commercial power supply, a smoothing capacitor for smoothing the rectified DC, an inverter circuit which is driven by the drive signal Dv and converts the smoothed DC into a high-frequency AC, a high-frequency transformer for stepping down the high-frequency AC to a voltage value suitable for welding, and a secondary rectifier for rectifying the stepped-down high-frequency AC to a DC.

A reactor WL smooths the output voltage E. An inductance value of the reactor WL is, for example, 200 µH.

Using a push feeding control signal Pc described later as input, a push-side feeding motor PM is controlled so as to perform a constant feeding-rate operation at a push feeding rate Pw. The push-side feeding motor PM includes an encoder (not shown) which outputs a push feeding-rate detection signal Pd.

Using a pull feed control signal Fc described later as input, a pull-side feeding motor WM feeds a welding wire 1 at a pull feeding rate Fw in a manner of alternating a forward feeding and a reverse feeding periodically. The pull-side feeding motor WM includes an encoder (not shown) which outputs a pull feeding-rate detection signal Fd.

The welding wire 1 is fed within a welding torch 4 in accordance with rotation of a push-side feeding roll 6 coupled to the push-side feeding motor PM and rotation of a pull-side feeding roll 5 coupled to the pull-side feeding motor WM and generates an arc 3 between this wire and base material 2. A welding voltage Vw is applied between a power supply tip (not shown) within the welding torch 4 and the base material 2, and thus a welding current Iw flows.

An output voltage setting circuit ER outputs an output voltage setting signal Er set in advance. An output voltage detection circuit ED detects and smooths the output voltage E, thereby outputting an output voltage detection signal Ed.

Using the output voltage setting signal Er and the output voltage detection signal Ed as input, a voltage error amplifier circuit EA amplifies an error between the output voltage setting signal Er (+) and the output voltage detection signal Ed (−) and outputs a voltage error amplified signal Ea. This circuit controls the welding power supply to a constant voltage.

A welding start circuit ST outputs a welding start signal St which becomes a high level or a low level in response to turning-on or off of a torch switch, respectively. Welding is started when the welding start signal St becomes the high level, whilst stopped when the welding start signal becomes the low level.

Using the welding start signal St and the voltage error amplified signal Ea as input, a driving circuit DV performs a PWM modulation control based on the voltage error amplified signal Ea in a case where the welding start signal St is at the high level and outputs the drive signal Dv for driving the inverter circuit.

An average feeding rate setting circuit FAR outputs an average feeding rate setting signal Far set in advance. Using the pull feeding-rate detection signal Fd as input, a pull average feeding-rate detection circuit FAD calculates an average value of this signal and outputs a pull average feeding-rate detection signal Fad. Using the pull average feeding-rate detection signal Fad and the push feeding-rate detection signal Pd as input, a feeding error amplifier circuit EF amplifies an error between the pull average feeding-rate detection signal Fad (+) and the push feeding-rate detection signal Pd (−) and outputs a feeding error amplified signal Ef.

Using the average feeding-rate setting signal Far, a push feeding rate correction signal Ps described later and the welding start signal St as input, the push feeding-rate setting circuit PR performs the following processing and outputs a push feeding-rate setting signal Pr. 1) Outputting the push feeding-rate setting signal Pr having a value of the average feeding-rate setting signal Far as an initial value. 2) When the welding start signal St changes to the low level (stop) from the high level (start), overwriting a value of the push feeding-rate correction signal Ps at that time point on the push feeding-rate setting signal Pr and storing it.

During the welding, using the push feeding-rate setting signal Pr and the feeding error amplified signal Ef as input, the push feeding-rate correction circuit PS performs correction according to a calculation of Ps=Pr+∫Ef·dt and outputs the push feeding-rate correction signal Ps. In a case where a value of the feeding error amplified signal Ef is positive, as a value of the push feeding-rate detection signal Pd is smaller than a value of the pull average feeding-rate detection signal Fad, the push feeding-rate correction signal Ps is corrected to a larger value. In contrast, when a value of the feeding error amplified signal Ef is negative, the push feeding-rate correction signal Ps is corrected to a smaller value. This correction is performed within a changeable range set by an upper limit and a lower limit.

Using the push feeding-rate correction signal Ps and the welding start signal St as input, the push feeding control circuit PC outputs, to the push-side feeding motor PM, a push feeding control signal Pc for feeding the welding wire 1 at the push feeding rate Pw corresponding to the value of the push feeding-rate correction signal Ps in a case where the welding start signal St is at the high level (start) and outputs the push feeding control signal Pc representing a feeding stop instruction in a case where the welding start signal St is at the low level (stop).

Using the average feeding-rate setting signal Far as input, the pull feeding-rate setting circuit FR outputs a pull feeding-rate setting signal Fr, with a feeding-rate pattern of alternating the forward feeding and the reverse feeding periodically, stored in correspondence to the average feeding-rate setting signal Far. A period where the pull feeding-rate setting signal Fr is 0 or more is a forward feeding period, whilst a period where this signal is smaller than 0 is a reverse feeding period.

Using the pull feeding-rate setting signal Fr and the welding start signal St as input, the pull feeding control circuit FC outputs, to the pull-side feeding motor WM, a pull feeding control signal Fc for feeding the welding wire 1 at the pull feeding rate Fw corresponding to the value of the pull feeding-rate setting signal Fr in a case where the welding start signal St is at the high level (start), and outputs the pull feeding control signal Fc representing a feeding stop instruction in a case where the welding start signal St is at the low level (stop), the pull feeding control circuit.

Figure 2:
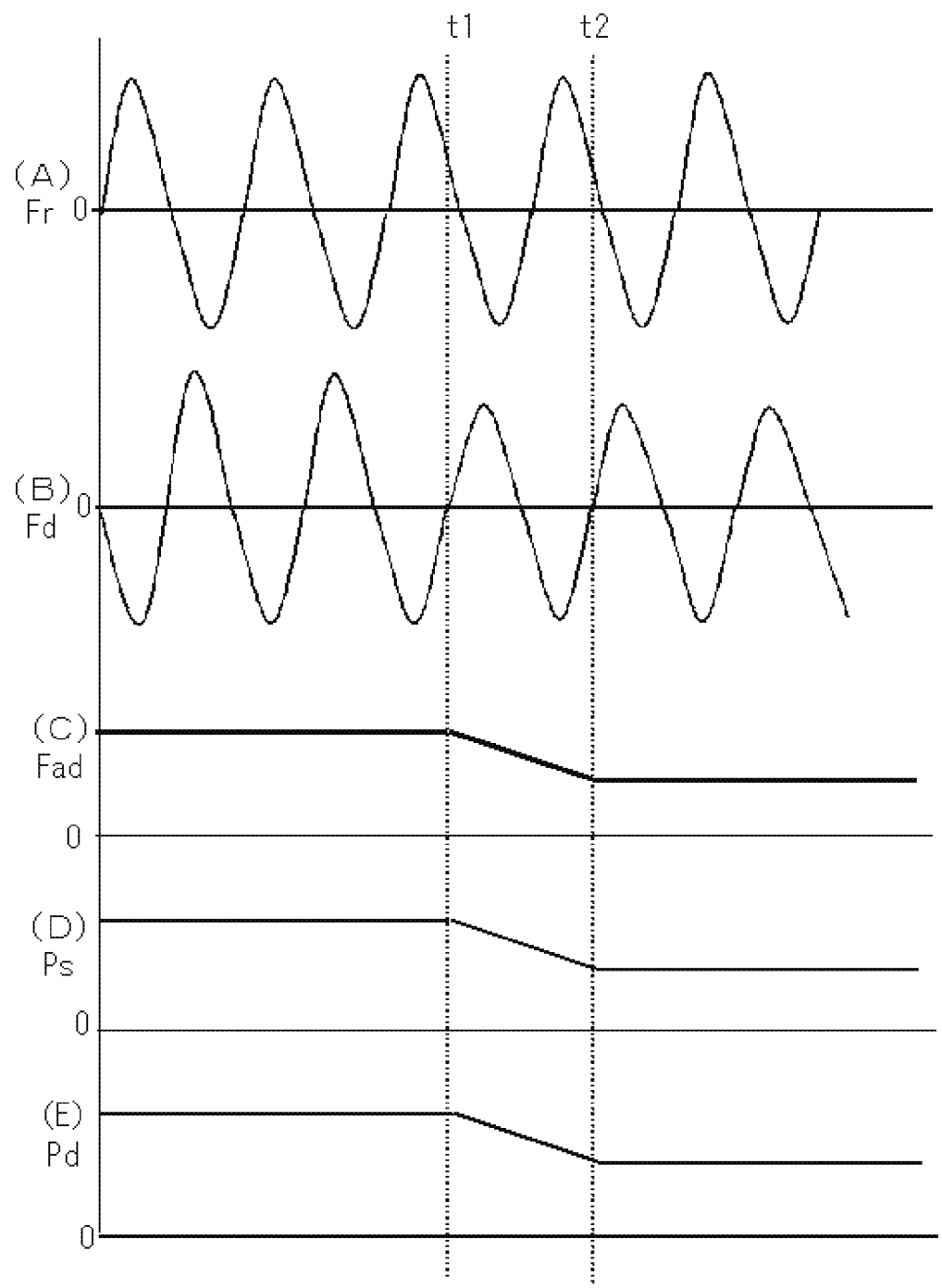
FIG. 2 A timing chart illustrating individual signals in the welding power supply of FIG. 1, for explaining the arc welding control method according to the first embodiment of the present invention.
Figure 3:
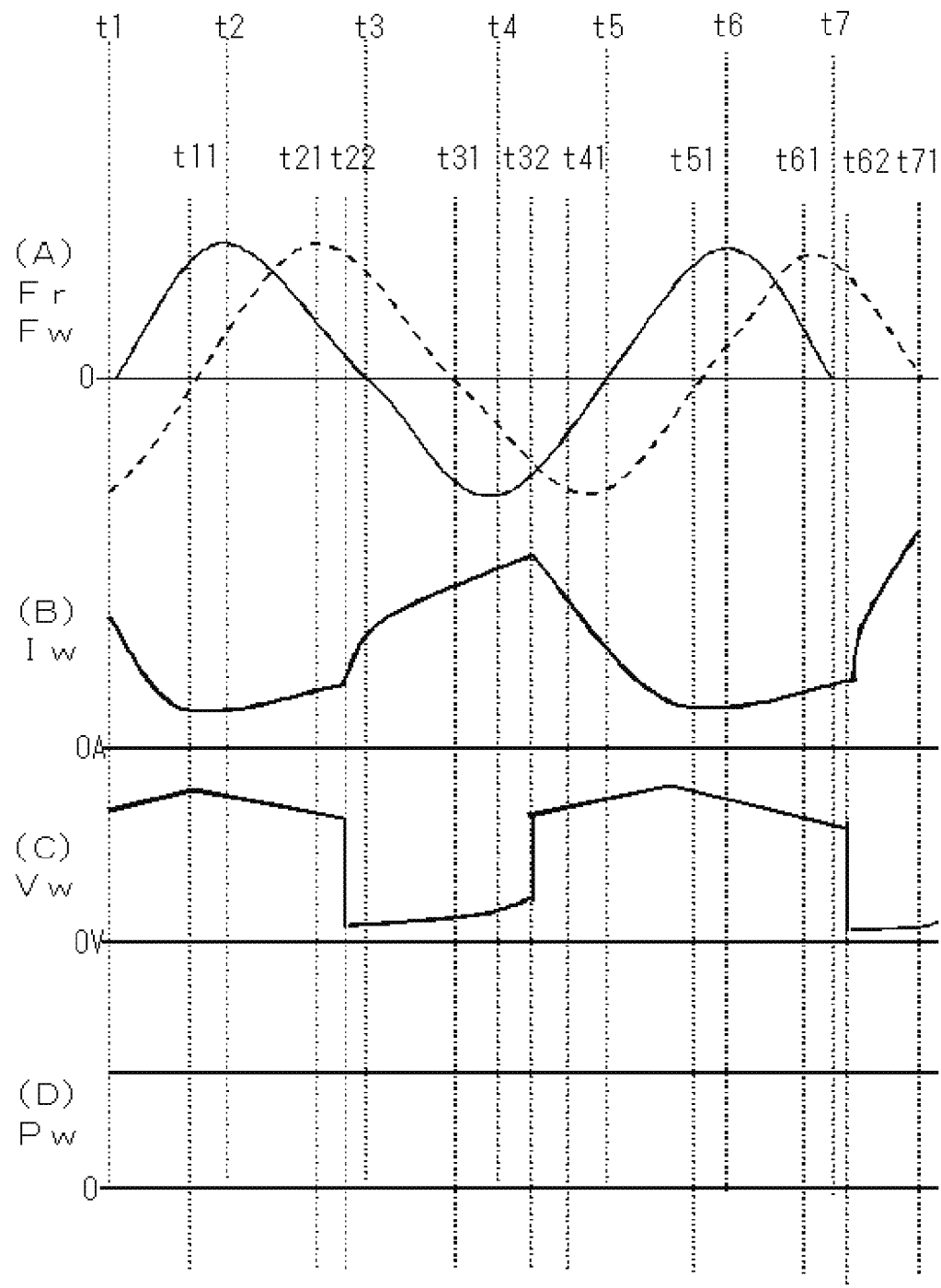
FIG. 3 A waveform diagram of the welding method according to a related art in which a push-pull feeding control system is employed to periodically repeat forward feeding and reverse feeding as to a feeding rate.

FIG. 2 is a timing chart illustrating individual signals in the welding power supply of FIG. 1, for explaining the arc welding control method according to the first embodiment of the present invention. (A) of this figure shows temporal change of the pull feeding-rate setting signal Fr, (B) of this figure shows temporal change of the pull feeding-rate detection signal Fd, (C) of this figure shows temporal change of the pull average feeding-rate detection signal Fad, (D) of this figure shows temporal change of the push feeding-rate correction signal Ps and (E) of this figure shows temporal change of the push feeding-rate detection signal Pd. In this figure, temporal changes of the welding current Iw and the welding voltage Vw are same as those of FIG. 3, with illustration thereof being omitted. Hereinafter explanation will be made with reference to this figure.

As shown in (A) of this figure, the pull feeding-rate setting signal Fr has a waveform of five periods during the welding. Each period of this signal has the same sinusoidal waveform set in advance. A positive value represents a forward feeding instruction and a negative value represents a reverse feeding instruction.

As shown in (B) of this figure, the pull feeding-rate detection signal Fd has a waveform which is shifted from the pull feeding-rate setting signal Fr and changes sinusoidally. This signal changes in a manner that an average value of the waveform on and after the third period becomes smaller than that before this period. This is because a feeding resistance changes to a larger value from a time point t1 as a start timing of the third period.

In accordance with this, as shown in (C) of this figure, the pull average feeding-rate detection signal Fad has a constant value until the time point t1, then reduces gradually from the time point t1, and becomes a constant value, which is smaller than the value until the time point t1, from a time point t2 at which the fourth period starts. Until the time point t1, each of the push feeding rate correction signal Ps shown in (D) of this figure and the push feeding-rate detection signal Pd shown in (E) of this figure is the same as the pull average feeding-rate detection signal Fad shown in (C) of this figure. After the time point t1, as the feeding resistance changes to the larger value, the pull average feeding-rate detection signal Fad reduces, and hence this signal is placed in a state of Pd>Fad. Thus the push feeding-rate correction circuit PS of FIG. 1 corrects the push feeding rate correction signal Ps shown in (D) of this figure to a smaller value. As a result, as shown in (E) of this figure, the push feeding-rate detection signal Pd also becomes smaller from the time point t1. In this manner, as shown in (D) of this figure, the push feeding rate correction signal Ps becomes smaller from the time point t1 and becomes a constant value from the time point t2. Then as shown in (E) of this figure, the push feeding-rate detection signal Pd also becomes smaller from the time point t1 and becomes a constant value from the time point t2.

Accordingly even if the feeding resistance changes and hence an average value of the pull feeding rate Fw changes, as the push feeding-rate correction signal Ps is corrected to follow the average value, the push feeding rate Pw is controlled so as to equal the average value of the pull feeding rate Fw. Consequently as the average value of the pull feeding rate Fw and the push feeding rate Pw are always placed in an equal state, a feeding state of the welding wire becomes stable.

The push feeding-rate correction signal Ps may be corrected with a predetermined period in a manner of being synchronized with the period of the pull feeding-rate setting signal Fr or the pull feeding-rate detection signal Fd. Although the explanation is made as to the case where the pull feeding-rate setting signal Fr changes in the form of the sinusoidal wave, this signal may be change in the form of a trapezoidal wave, a triangular wave or the like.

According to the first embodiment, the average feeding rate of the pull-side feeding motor is detected, and the push feeding-rate setting value is corrected to the detected average feeding rate of the pull-side feeding motor. Consequently, even if the feeding resistance changes and hence the average feeding rate of the pull-side feeding motor (average value of the pull feeding rate Fw) changes, as the push feeding-rate setting value is corrected (push feeding-rate correction signal Ps) to follow the average value, the feeding rate of the push feeding motor (push feeding rate Pw) is controlled so as to equal the average feeding rate of the pull-side feeding motor. Consequently as the average feeding rate of the pull-side feeding motor and the feeding rate of the push feeding motor are always placed in an equal state, the feeding state of the welding wire becomes stable. Accordingly in this embodiment, in the welding of alternating the feeding of the welding wire between the forward feeding and the reverse feeding periodically according to the push-pull feeding control, even if the feeding resistance changes, the feeding state of the welding wire can be maintained stably.

Further according to the first embodiment, the corrected push feeding-rate setting value can be stored upon completion of the welding. That is, the push feeding-rate setting value corrected finally at the time of completing the welding can be stored. Consequently, as the next welding can be started with the suitable push feeding-rate setting value having been corrected, welding quality can be further stabled.

Further according to the first embodiment, the changeable range is set to the correction value of the push feeding-rate setting value. That is, the changeable range is limited by setting the upper limit and the lower limit with respect to the correction value. This changeable range is set as a range in which a welding state becomes stable. Consequently, the welding state can be suppressed being placed in an unstable state due to the correction.

INDUSTRIAL APPLICABILITY

The present invention can provide the arc welding control method which, in the welding of alternating the feeding of the welding wire between the forward feeding and the reverse feeding periodically according to the push-pull feeding control, can stably maintain the feeding state of the welding wire even if the feeding resistance changes.

Although the present invention is explained with reference to the particular embodiment, the present invention is not limited thereto but the embodiment may be changed in various manners within a range not departing from the technical concept disclosed in the present invention.

This application is based on Japanese Patent Application (Japanese Patent Application No. 2014-003217) filed on Jan. 10, 2014, the content of which is incorporated herein by reference.

DESCRIPTION OF REFERENCE NUMERALS 1 welding wire
2 base material
3 arc
4 welding torch
5 pull-side feeding roll
6 push-side feeding roll
DV driving circuit
Dv drive signal
E output voltage
EA voltage error amplifier circuit
Ea voltage error amplified signal
ED output voltage detection circuit
Ed output voltage detection signal
EF feeding error amplifier circuit
Ef feeding error amplified signal
ER output voltage setting circuit
Er output voltage setting signal
FAD pull average feeding-rate detection circuit
Fad pull average feeding-rate detection signal
FAR average feeding-rate setting circuit
Far average feeding-rate setting signal
FC pull feeding control circuit
Fc pull feeding control signal
Fd pull feeding-rate detection signal
FR pull feeding-rate setting circuit
Fr pull feeding-rate setting signal
Fw pull feeding rate
Iw welding current
MC power supply main circuit
PC push feeding control circuit
Pc push feeding control signal
Pd push feeding-rate detection signal
PM push-side feeding motor
PR push feeding-rate setting circuit
Pr push feeding-rate setting signal
PS push feeding-rate correction circuit
Ps push feeding-rate correction signal
Pw push feeding rate
ST welding start circuit
St welding start signal
Vw welding voltage
WL reactor
WM pull-side feeding motor

The invention claimed is:

1. An arc welding control method, comprising:
feeding a welding wire according to a push-pull feeding control using a push-side feeding motor, which rotates in a forward feeding direction at a feeding rate set to a push feeding-rate setting value, and a pull-side feeding motor, which alternates a forward feeding rotation and a reverse feeding rotation periodically;
generating, by a feeding-rate setting circuit, short-circuiting periods and arc periods to perform welding;
detecting, by a detecting circuit, an average feeding rate of the pull-side feeding motor;
determining, by an error amplifier circuit, an error between the feeding rate set and the average feeding rate;
overwriting, by the feeding-rate setting circuit, the push feeding-rate setting value to be equal with the detected average feeding rate of the pull-side feeding motor to maintain a constant feeding rate during the welding,
wherein the constant feeding rate is maintained by modifying an operation of the push-side feeding motor to provide an adjusted feeding rate in response to the average feeding rate of the pull-side feeding motor.

2. The arc welding control method according to claim 1, further comprising storing the corrected push feeding-rate setting value upon completion of the welding.

3. The arc welding control method according to claim 1, wherein the push feeding-rate setting value is corrected according to a calculation of $Ps=Pr+\int EH \cdot dt$, and wherein
Ps is a push feeding-rate correction signal,
Pr is a push feeding-rate setting signal, and
Ef is a feeding error amplified signal.

4. The arc welding control method according to claim 3, wherein, when a value of the feeding error amplified signal is positive, the push feeding-rate correction signal is corrected to a larger value.

5. The arc welding control method according to claim 3, wherein, when a value of the feeding error amplified signal is negative, the push feeding-rate correction signal is corrected to a smaller value.

6. The arc welding control method according to claim 1, wherein the correcting of the push feeding-rate setting value is performed in response to a change in feeding resistance.

7. The arc welding control method according to claim 1, wherein the correcting of the push feeding-rate setting value includes adjusting the push feeding-rate setting value to be higher and lower during the welding.

* * * * *